INVENTOR.
LEENDERT KOSTEN
BY Hugh A. Kirk
ATT'Y

RECODING EQUIPMENT IN AN AUTOMATIC COMMUNICATION SYSTEM

INVENTOR.
LEENDERT KOSTEN
BY Hugh A. Kirk
ATT'Y

May 6, 1958 L. KOSTEN 2,833,863

RECODING EQUIPMENT IN AN AUTOMATIC COMMUNICATION SYSTEM

Filed Jan. 11, 1954 5 Sheets-Sheet 3

INVENTOR.
LEENDERT KOSTEN
BY Hugh A. Kirk
ATT'Y

INVENTOR.
LEENDERT KOSTEN
BY Hugh A. Kirk
ATT'Y

May 6, 1958 L. KOSTEN 2,833,863

RECODING EQUIPMENT IN AN AUTOMATIC COMMUNICATION SYSTEM

Filed Jan. 11, 1954 5 Sheets-Sheet 5

INVENTOR.
LEENDERT KOSTEN
BY Hugh A. Kirk
ATT'Y 2,833,863

RECODING EQUIPMENT IN AN AUTOMATIC COMMUNICATION SYSTEM

Leendert Kosten, The Hague, Netherlands, assignor to Staatsbedrijf der Posterijen, Telegrafie en Telefonie, The Hague, Netherlands Application January 11, 1954, Serial No. 403,349

Claims priority, application Netherlands January 13, 1953

13 Claims. (Cl. 179—18)

The invention relates to equipment in a telecommunication system which offers the possibility of re-transmitting a coded message received in the equipment in another code, the code conversion being effected according to instructions recorded by a second system.

Equipment of this kind can be used to solve several different problems, e. g.:

(1) For diverting calls in a telephone exchange in accordance with instructions supplied by subscribers (message service);

(2) For recoding telegrams in connection with differences of language or parts of telegrams such as service instructions or addresses;

(3) For indirect routing according to traffic loads in certain directions;

(4) For changing metering zones in accordance with the time (extension of cheap zones during the night), etc.

In the case of a message service, an embodiment of which will be described below, the said first coded message may consist e. g. of ringing current arriving on a line belonging to a subscriber who is connected to the message service equipment. The subscriber can give instructions to route contingent calls arriving for him to another number. These instructions may or may not be given by the intermediary of the service via the said second path to a central register.

This instruction is recorded in the system in a place which is characteristic of the distinctive number under which the subscriber is connected to the message service equipment. Contingent later distinctive signals entail the transmission of signals recoded according to the instruction.

If the diversion number is thus reached and found free, the call held in the meantime is switched over; if the number is not free, busy tone is sent to the calling subscriber.

The above-mentioned operation could be duplicated by means of a complicated computer. One of the purposes of the invention, however, resides in that, through proper choosing of the various components, such as registers, magnetic drums and common connecting elements thereof, and so making them co-operate, an economically feasible system is obtained which can find application in many fields.

In this embodiment the (original) subscriber's number, as represented by the distinctive signal, constitutes the starting point for the transmission, by comparison with the data stored in the memory according to the above-mentioned instructions (number of the call to be diverted). This signal, which is compared in the equivalence testing device with diverting data to be recorded or those demanded about distinctive signals only causes this coincidence circuit to open gates to registers (impulse delaying or parallel registers) for recording or reproducing such data, respectively, at the moments the distinctive number, while being indicated by the memory, is also present at the end of the said registers.

The equipment according to the invention, however, can be put into practice just as easily so that not the end but only an intermediate part of a connection to be established is variable.

In that case the diverting of connections to be established can be effected by the means to be described along arbitrary routes to be determined beforehand from time to time, in accordance with passive traffic possibilities.

The invention will be elucidated in connection with the example of a switchover service or message service.

The facilities offered by a message service are the following:

(*a*) Noting the time of arrival of a call, as well as the caller's name and number;

(*b*) Referring the call to another number;

(*c*) Noting the communication;

(*d*) Making a communication.

In principle the referring faculty (*b*) lends itself to automatization. Notably either the reference system can be maintained, in which case a speaking mechanism is introduced, or the arriving calls are directly switched over to the substitute number.

If such an automatized system is chosen, the facilities mentioned under (*a*), (*c*) and (*d*) must be reduced to the possibilities of referring and switching-over, e. g. to official or private bureaux. The switch-over faculty will probably provide a solution in many cases in which the old message handling service cannot, such as evening and night connection for managers and proxies of small businesses. An order for switching over in the automatic case, is immediately carried out.

For this switch-over problem there are several solutions (U. S. Patent Nos. 1,734,083 and 1,963,123; No. 2,124,913, all of which, however, have for each subscriber an individual recoding unit, placed either at the subscriber's premises or in the exchange. These solutions are not economically feasible.

The newer technique of utilizing memories having a very large information storage capacity (and of which the cost per information element is only a fraction of that of a relay register) offers the possibility of a practical solution by making use of one central register for a large group of subscribers of the switch-over or reference service (e. g. some thousands). In view of the required information storage capacity and the relatively small demands to be made with regards to accessibility of the central register, a magnetic drum is the most economical. In that which follows a summary description will be given of a switch-over service according to this principle.

Figure 1:
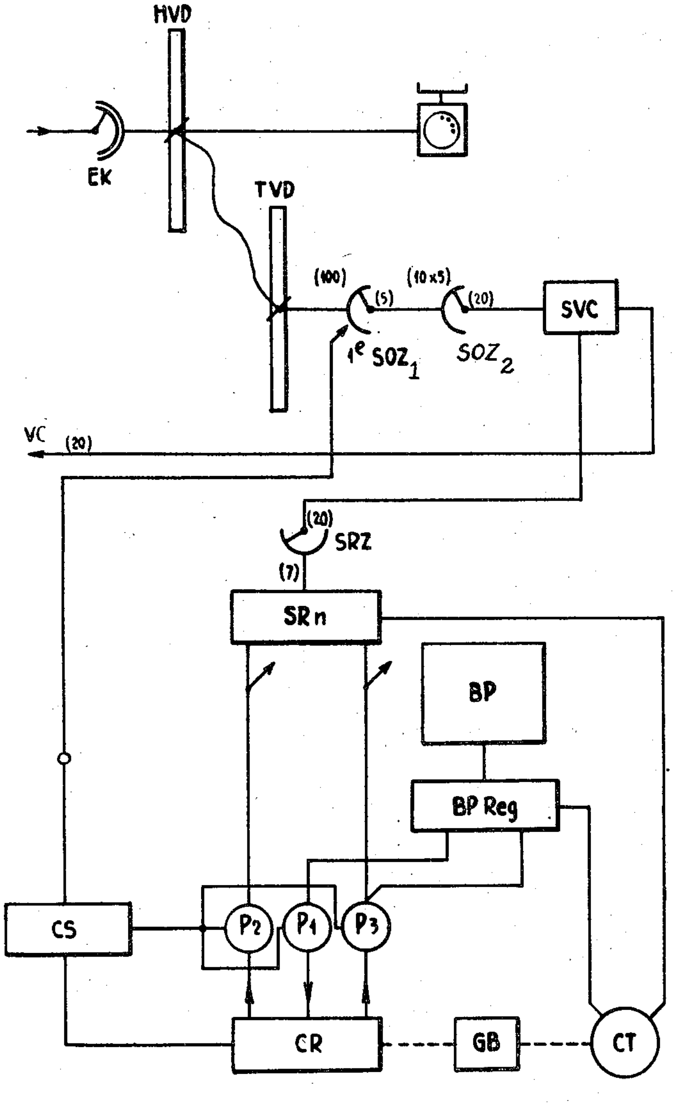
Fig. 1 is a schematic block wiring diagram of a switch-over equipment according to this invention adapted to a thousand subscribers in an exchange of an automatic telephone system.

Referring now to Fig. 1, for each subscriber of the switch-over service, a connection is made between the main distributing frame HVD and an intermediate distributing frame TVD. The number a subscriber has on the intermediate distributing frame TVD serves at the same time as a distinctive number when instructions are sent in for changes to be effected.

As soon as a subscriber to the switch-over service is called, a path is established via the special line finders SOZ1 and SOZ2 to the special connecting circuit SVC. The ringing current serves in this case as a starting criterion. Besides this connection the normal connection is maintained and ringing current goes out to this connection.

To special connecting circuit SVC at the same time has already found via the special register finder SRZ a special register SR. These registers are connected successively according to a fixed scheme to the central register CR. The face-plate CT serves in this case as a rotary distributor. The operating time per special register SR is approximately 140 ms. If there are 8 special registers a complete cycle of the distributor CT will take 8×0.14 s.=1.12 seconds. Thus a call has to wait an average of 0.56 s. for the central register CR.

As soon as the operating time for a certain special register SR has come, marking signals are sent from this register via the special register finder SRZ, the special connecting circut SVC and the special second line finder SOZ2 to a number of wipers of the special first line finder SOZ1. These signals are sent via wires in the marking multiples to the gate $P_2$. As a result of this the distinctive number of the called subscriber is known in this gate.

All the necessary data for all the 1000 subscribers are recorded in the central register CR (a magnetic drum). This information my reside in the substitute number or in an indication that the subscriber makes no use of the switch-over service at the moment, so that no switch-over must take place.

The datum belonging to the correct line is extracted from the central register CR by $P_2$ and transmitted to special register SR via distributor CT. In the special register SR this datum is stored in a static magnetic register, such as the one described by An Wang (see "Static magnetic storage and delay line," Journal of Applied Physics, January 1950). The recording occurs very quickly by means of an impulse system. Then this magnetic register gives out the impulses at dial speed, so that special connecting circuit SVC can assure the transmission of digits to the connecting circuit VC in the exchange before the switch-over, at least if switch-over is desired. In the alternative case the special register SR is disconnected. The special connecting circuit SVC remains connected until the ringing period has finished, in order to avoid a fresh start of the special line finders SOZ1 and SOZ2.

A point to be considered still is at which moment the answering signal wiill be sent by special connecting circuit SVC via the line finders SOZ1 and SOZ2 to the final selector EK in the exchange. It is possible to do this only when the answering by the substitute number is reported by the connecting circuit VC. In that case, however, the ringing period is lengthened for the calling subscriber by 12 to 15 seconds, which may lead to the disconnection of trunk calls. An alternative consists in giving the answering signal immediately, or after the establishment of the switch-over connection. This is believed to be permissible, because the switch-over service performs the same function (looking for people) as telephone operators or servants (who often do this less efficiently).

The release of the connection is effected in backward direction, after connecting circuit VC has received the clearing signal from the substitute station.

It may be useful to provide the special registers SR with time circuits which refer the call to an operator if the substitute station does not answer.

A change of the data stored in central register CR is immediately effected on telephonic request at the operator's position BP. The gate $P_3$ serves for identifying the place where such a datum change must be written or recorded in central register CR. The operator's place has been assigned in the cycle of rotary distributor CT a similar place as has each of the special registers SR. Actually gates $P_1$, $P_2$, central register CR and rotary distributor CT are more or less combined in one unit.

If instead of a switch-over operation only an automatic reference is wanted, use can be made of a central speaking installation capable of issuing a general announcement as well as the digits 0, 1, . . . , 9. After the general announcement the said magnetic register in SR selects digit after digit, so that these digits can be obtained successively in spoken form from the speaking installation.

Repetition of the digit series is possible, because the magnetic register can retain its content while giving it out as impulses.

It is possible, and maybe desirable, to provide the switch-over system and the reference system beside each other for optional use in the same installations. On additional indication accompanying each item stored in central register CR decides which possibility is desired by a given subscriber.

Now some parts of the installation differing from the traditional automatic switching technique will be described in detail.

Figure 2:
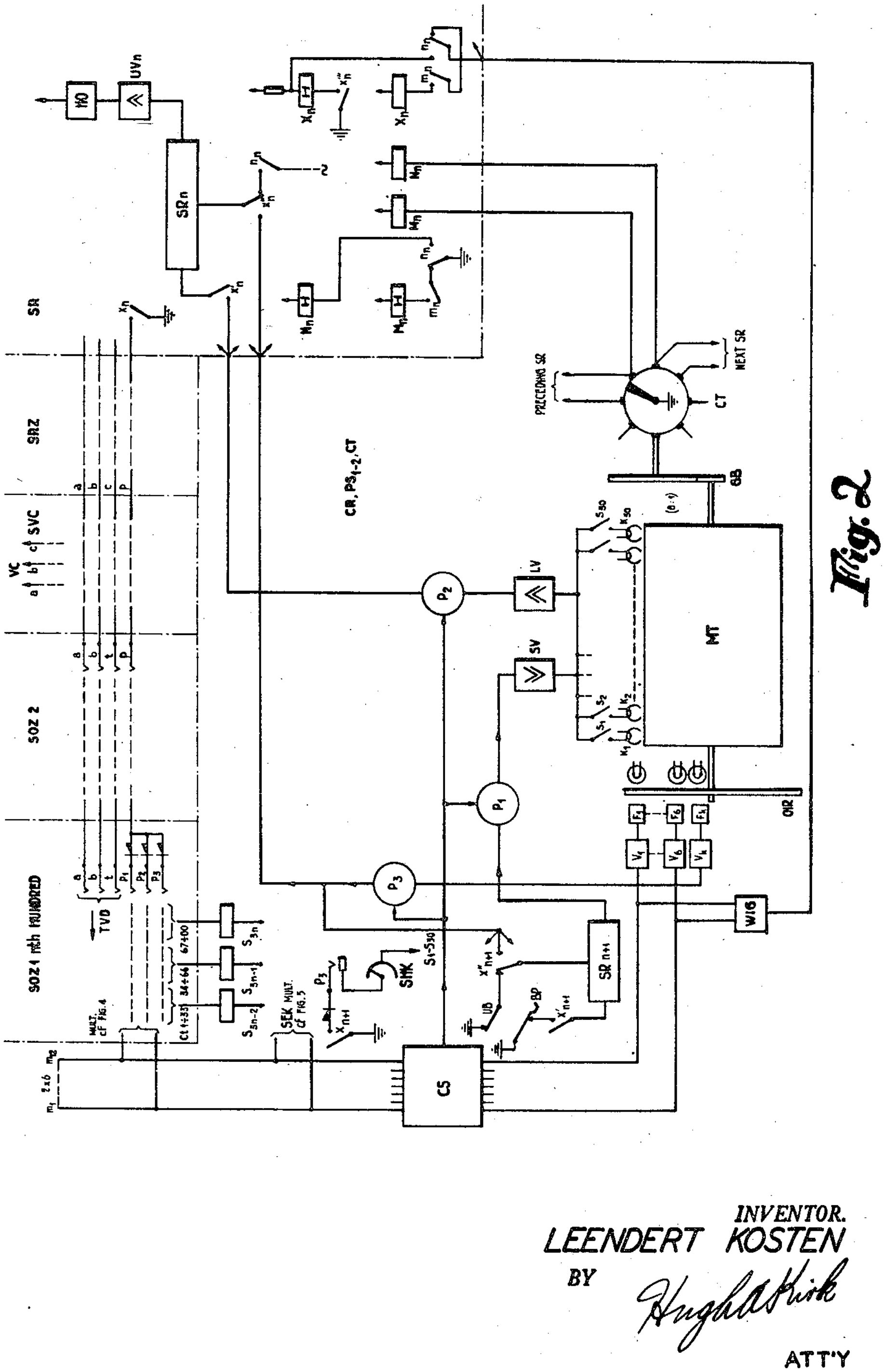
Fig. 2 is a more detailed schematic wiring diagram of the switch-over equipment portion of the system shown in Fig. 1.

See herefor Fig. 2 first.

Each track on the magnetic drum contains the switch-over data of 33 or 34 subscribers arranged according to distinctive number. A distinctive number comprises 6 digits, each consisting of 5 elements (in the "2 out of 5" code). Besides, an extra element has been added, which may have the meaning of: "subscriber makes no use of the switch-over service at the moment." Consequently, the number of code elements on each track is 34×31 =1054.

Moreover the drum circumference has an empty part corresponding to the space LR on the optical impulse wheel OIR (see Fig. 3), which provides an interval of 30 ms. for switching over the selecting relays, etc. For 1000 subscribers 10×3=30 tracks are needed on the drum. The drum can easily contain the data for a few thousands of subscribers.

Figure 3:
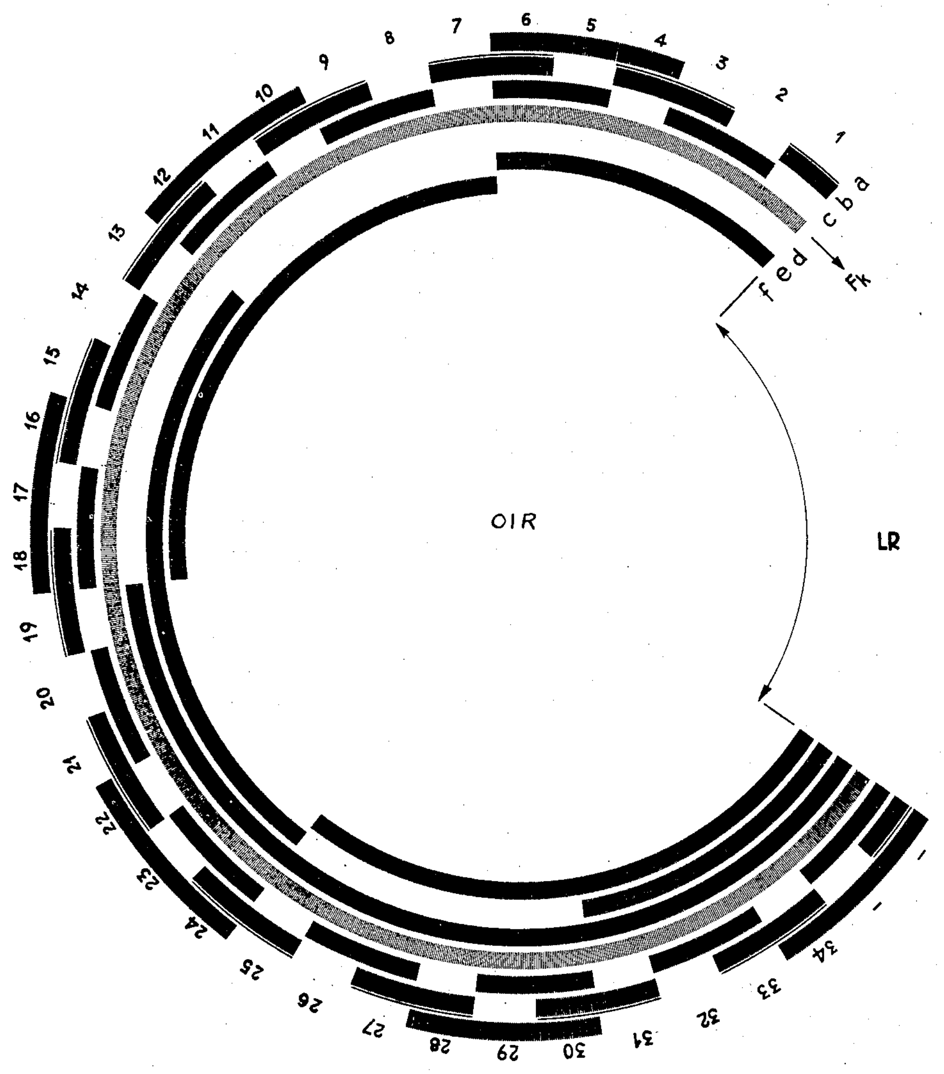
Fig. 3 is a face diagram of the optical impulse wheel for controlling and synchronizing the system shown in Fig. 2.

An optical impulse wheel OIR is coupled with the drum. On this wheel there are several tracks provided with impulse markings, which are read by photocells $F_1$, . . . $F_6$ and $F_k$. Fig. 3 shows this glass impulse wheel. The middle track is scanned by photocell $F_k$ and marks with timing impulses the places of the separately stored elements.

The marking on the other 6 tracks is constant for 31 successive elements and indicates the place in the series of 33 or 34. This marking is effected by means of two digits in the senary system (36 possibilities). The digits of this code are coded again in the binary system as follows:

*Table 1*

| digit | *a* | *b* | *c* |
|---|---|---|---|
| 1 | 0 | 1 | 0 |
| 2 | 0 | 0 | 1 |
| 3 | 0 | 1 | 1 |
| 4 | 1 | 1 | 0 |
| 5 | 1 | 0 | 1 |
| 6 | 1 | 1 | 1 |

The tracks *a*, *b* and *c* indicate e. g. the presence or absence of impulses on these tracks of photocells $F_1$, $F_2$ and $F_3$ as units marking. The same scheme with the tracks *d*, *e* and *f* for the impulses on the photocells $F_4$, $F_5$ and $F_6$ gives the sixes marking.

The rotary distributor CT is coupled by means of a slowing-down gear GB with the drum. The gearing proportion is by one greater than the number of registers (because the operator's position has a similar connection as each of the registers).

When a special register SR gets a call to deal with, the energizing circuit for its relay M (Fig. 2) is closed by relays that are not shown to form the full line circuit to the distributor CT shown in Fig. 2. As soon as distributor CT has passed the position shown, in Fig. 2, said relay M is connected to it and operates. A holding winding MH is energized via contacts $n^-$ and $m^+$ (meaning the deenergized or back contact of $n$ and the energized or front contact position of $m$, respectively). The operation of relay M occurs in the middle of the operating period of the drum.

At the beginning of the next empty interval of the drum the impulse generator WIG issues a short impulse, which energizes relay X via contacts $n^-$ and $m^+$. The relay X remains energized via contact $X'''^+$ and a second X-winding XH.

During the next operating period of the drum MT, relay N receives current via distributor CT and is held via contact $n^+$ and another N winding NH. The holding winding of relay winding MH is interrupted; relay M releases.

With the following impulse generator of WIG the holding winding XH of relay X is short-circuited via contact $n^+$, so that relay X releases. Thus relay X remains energized during one entire revolution of the drum MT, the beginning and end of its operating period coinciding with the beginning of the empty period of the drum.

In this period a $x^+$ contact in SR grounds the $p$-wiper of special register finder SRZ and thereby also the $p$-wiper of the special line finder SOZ2 and $p_1$-, $p_2$ and $p_3$-wipers of the special line finder SOZ1.

Via the $p_3$-wiper one of the S-relays is energized and connects by means of its contact one of the reading and recording heads $K_1$ to $K_{30}$ of the magnetic drum to the reading and writing or recording amplifiers LV and SV. 30 ms. (during space LR of Fig. 3) are available for successive operation (or release) of relays X and S. After this interval relay S may no longer operate.

Figure 4:
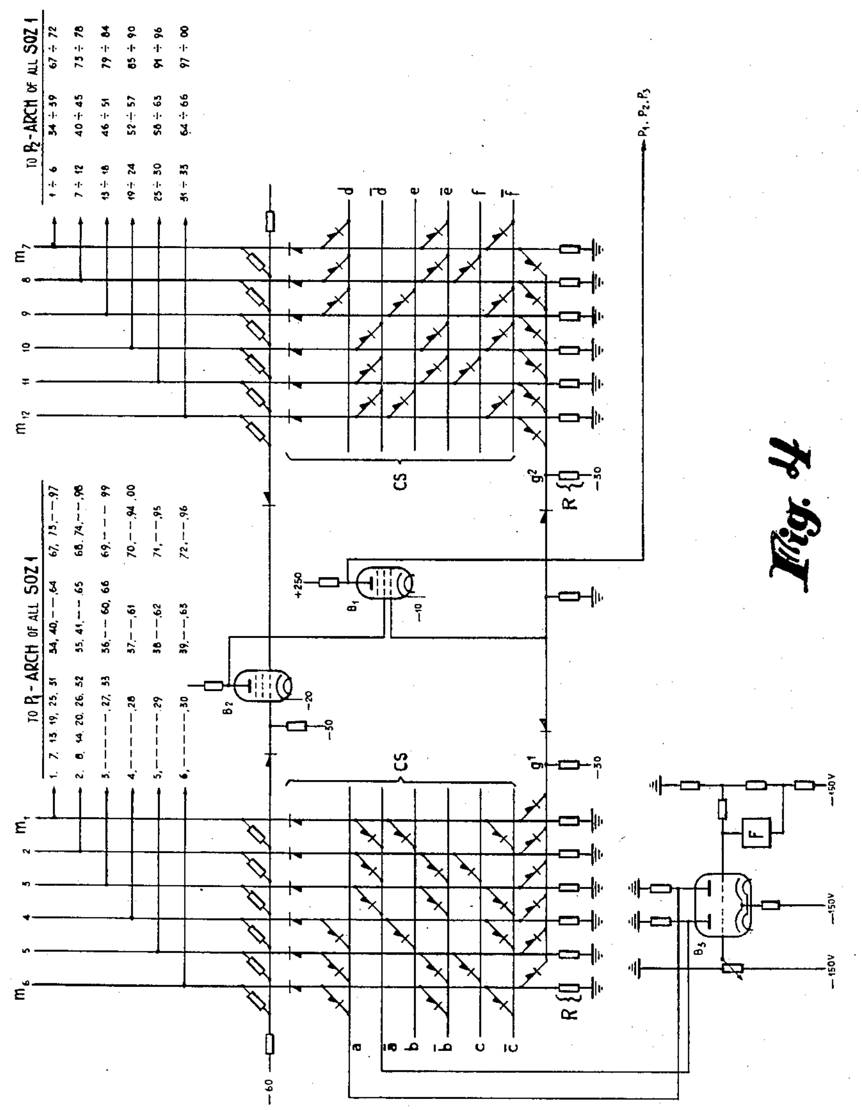
Fig. 4 is a detailed schematic wiring diagram of the coincidence circuit portion of Fig. 2.

The ground potential present at the wipers $p_1$ and $p_2$ is passed on to 2 of the 2 x 6 marking wires. The multipling of the $p_1$- and $p_2$-arches is shown in Fig. 4. In this case too there is a two-digit senary coding within the 33- or 34-group. The representation of the numbers 1 to 6 is linear, however (one out of six). The presence of resistors R (Fig. 4) causes one of the marking wires 1, . . . , 6 to have ground potential, whereas the others have potentials of $-30$ v.

The coincidence circuit CS indicated in Fig. 2 compares the data concerning the place of the subscribers in the 33 or 34 group, data received from the $p_1$- and $p_2$-wires via the marking wires $m_1$ to $m_{12}$, with the succession of data about the place on the drum cilrcumference supplied by the photocells $F_1$ to $F_6$ via the amplifiers $V_1$ to $V_6$. As soon as there is agreement, the gates $P_2$ and $P_3$ are opened, as a result of which, in a way to be described further, the data belonging to the relevant subscriber and stored in the drum are transmitted to the impulse delaying register in special register SR.

The coincidence circuit CS works as follows.

The tube B3 shown in Fig. 4 is the amplifier belonging to photocell F. If the photocell F receives light the left-hand triode carries current; in the contrary case the right-hand triode is conductive. The conductors $a$ and $\bar{a}$ departing from the anodes have voltages of 0 and $-30$ v., respectively, in the presence of light. If no light strikes the photocells the voltages are reversed. The first case will be indicated by $a=1$. Similarly, there are photocells and amplifiers corresponding to the pairs $b$, $\bar{b}$ and $c$, $\bar{c}$, as well as $d$, $\bar{d}$, $e$, $\bar{e}$ and $f$, $\bar{f}$.

If the data at the wires $m_1, \ldots m_6$ are designated by $\bar{m}_1, \ldots \bar{m}_6$, and those at the wires $a, \bar{a}, \ldots, \bar{c}$ also by the wire symbols, the convention being made that the symbols have values 1 and 0 for 0 and $-30$ v., respectively, there is equivalence between the coding of the marking wires $m_1, \ldots, m_6$ and the coding of the optical impulse wheel, if $$m_1^{\bar{a}\bar{b}\bar{c}}+m_2^{\bar{a}\bar{b}c}+m_3^{\bar{a}bc}+m_4^{a\bar{b}\bar{c}}+m_5^{a\bar{b}c}+m_6^{abc}=1$$

(cf. Table 1)

This formula is materialized in the rectifier arrangement represented at the left in Fig. 4. In the case of equivalence of codes point $g_1$ has zero potential; in other cases it has a potential of $-30$ v.

Now the drum segment must be chosen for which the units code as well as the sixes code for the marking wires and the photocells are equivalent. For the sixes an identical rectifier arrangement has been provided, fed by marking wires $m_7, \ldots m_{12}$ and the photocell amplifier outputs $d$—$\bar{d}$, $e$—$\bar{e}$, $f$—$\bar{f}$. The equivalence manifests itself by ground potential at point $g_2$. Tube $B_1$ is so coupled by rectifiers with points $g_1$ and $g_2$ that it only draws current in the case of equivalence at both ends. In this case the anode voltage of $B_1$ falls and this voltage is passed on to gates $P_1$, $P_2$ and $P_3$ (see Fig. 2). Consequently, in the course of one revolution these gates are just opened during the passage of a drum segment corresponding to one connection.

Then the data of the correct subscriber are led via relay contact $s^+$ (see Fig. 2), amplifier LV, gate $P_2$ and closed $x'$-contact to the input of the impulse delaying register in special register SR. This is a static magnetic register according to An Wang, which is capable of taking up information from the drum at a quick rate and reproducing it later on at a slow rate. The impulse delaying operation occurring when the register is charged is controlled by the timing impulses supplied from the impulse wheel OIR via amplifier $V_k$, gate $P_3$ and an $x$-contact.

When the correct data have been stored in the impulse delaying register SR, relay X releases again at the end of a drum cycle. The control of the impulse delaying register SR (bottom) is connected then via $x^-$ and $n^+$ to a low-frequency impulse source which is not shown. The data are given out by the impulse delaying register SR and converted into relay impulses in the output amplifier UV (cold cathode tube). In the recoding device the elements, taken five at a time, are converted from the 2 out of 5 code into a decimal linear code (impulse series).

These impulse series control (in a manner not shown) the selection of the switch-over path to the substitute subscriber.

When the relevant subscriber makes no use of the switch-over service, the extra 31st element preceding the other 30 elements has already passed through the impulse delaying register before relay X releases. The cold cathode tube UV has already been lighted then, and immediate disconnection of special register SR can be effected herewith.

The electronic components having a limited lifetime (the tubes) are all (except the one cold cathode tube in special register SR) concentrated in the central part of the system comprising CR, $PS_1$—$PS_2$, CT. It even may be possible that the cold cathode tube can be replaced by a polarized relay.

The operator's position BP is connected to distributor CT in the same way as the special registers SR′. This means that the operator's position is connected every time to the central register CR during the drum cycles in which no special register SR′ is connected to it and, consequently, changes of data can be carried out. So the operator's position circuit disposes of a similar set of relays M′, N′ and X′, as in SR, namely in BP Reg. shown in Fig. 2 as register SR′.

Figure 5:
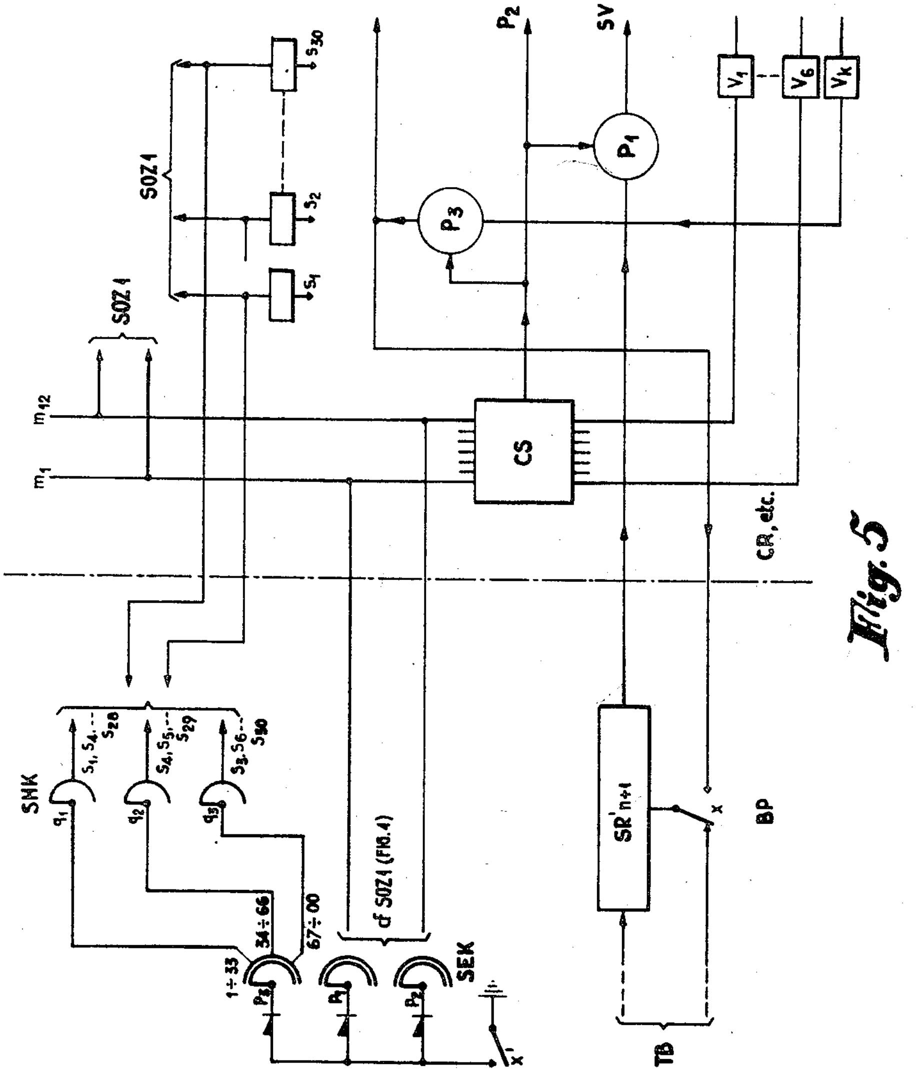
Fig. 5 is a more detailed schematic wiring diagram of that part of the circuit of Fig. 2 relating to the operator's position circuit and its connection with the rest of the adjacent switch-over equipment.

Fig. 5 shows a part of the operator's position circuit BP. If a datum must be changed the special hundreds selector SHK is first positioned according to the hundreds and the special final selector SEK according to the tens and units of the distinctive number. Via the $p_1$- and $p_2$-wipers of special finder selector SEK marking voltages are prepared for the marking wires in substantially the same way as would be done on the first special line finder SOZ1 by the special BP registers SR'. Via the $p_3$-wiper of special final selector SEK and one of the wipers $q_1$, $q_2$ or $q_3$ of special hundreds selector SHK, the correct S-relay receives a preparatory marking.

The digits of the new substitute number are taken from a keyboard (not shown), encoded in the 2 out of 5 code and stored at a low rate into the impulse delaying register SR'. Then a circuit is closed for the M- and N-relays (not shown).

In a way similar to special register SR, the X'-relay (not shown) operates for the duration of exactly one revolution of the drum. During this period an $x'$-contact grounds the $p$-wipers of special final selector SEK, as a result of which the marking voltages are applied to wires $m_1, \ldots m_{12}$ and the correct S-relay operates.

The coincidence circuit works again in exactly the same way and opens the gates $P_1$ and $P_3$ for one specified distinctive number. $P_3$ transmits a series of timing impulses from amplifier VK, which cause the impulse delaying register to give out its content of information. This information arrives via gate $P_1$ at the writing or recording amplifier SV and is stored then via the correct $s$-contact at the right place on the drum.

The arrangement described only responds to incoming calls. A call-detecting device responding to the ringing current seems practicable. As the installation does not respond to outgoing calls, it is impossible to remind a subscriber by a special signal of the fact that his station has been switched over. If this is necessary a small repeating device per subscriber's line cannot be dispensed with. This device may contain e. g. a relay in the $c$-wire and a series relay in the line. If one of these two relays is energized, there is an incoming or an outgoing call. In order to provide in that case for a sufficiently quick operation of the special line finders as a result of outgoing calls (viz. ready before the holding relays in the exchange operate), crossbar apparatus will be necessary.

It may be necessary sometimes to concentrate the central apparatus in one place and to disperse the line finders over several places. In that case it is probably uneconomical to prolong the marking wires to the central point. The most favorable solution seems to consist in providing the registers on the side of the special connecting circuit SVC (see Figs. 1 and 2) with a repeating device. In this case the identity of the called subscriber must be transmitted further to the register by the repeating device (in the form of impulses or by means of more frequencies).

As compared with the manual system there is a gain of cable wires, as the connections between repeating devices and registers are not held for the entire duration of a conversation, but only for a few seconds during the establishment of the communication.

While I have illustrated and described what I regard to be the preferred embodiment of my invention, nevertheless it will be understood that such is merely exemplary and that numerous modifications and rearrangements may be made therein without departing from the essence of the invention, I claim:

1. A recording equipment for an automatic communication system having a plurality of subscribers and an automatic switching apparatus, comprising: a magnetic drum which stores impulse signals at a more rapid rate than said automatic switching apparatus can operate and has different preselected portions thereof corresponding to different subscribers, means for recording and reading said signals on said drum, an operator's position circuit for changing the signals recorded on said drum, a coincidence circuit for selecting a position on said drum corresponding to a desired subscriber, and special register circuits for storing signals corresponding to a selected position on said drum for a corresponding subscriber and transforming said stored signals at a relatively slower rate for operation of said automatic switching apparatus.

2. An equipment according to claim 1 wherein said coincidence circuit is controlled by means for comparing impulse code signals corresponding to the position of said drum and to said desired subscriber.

3. An equipment according to claim 1 including gate circuits controlled by said coincidence circuit for controlling the transmission of said signals recorded on said drum to said special register circuits.

4. In an automatic communication system having a plurality of subscribers' lines and an automatic switching system having a main distributing frame and a connecting circuit for said subscribers' lines, a switch-over special service system comprising: an intermediate distributing frame connected to the subscribers' lines on said main distributing frame which require special service, special impulse delaying registers, a multi-stage concentrating means for connecting said lines to said intermediate distributing frame to said special registers, a central register means comprising a magnetic drum recording, reading, synchronizing and distributing means for storing special signals corresponding to each subscriber requiring special service, a coincidence circuit means for selecting the special signals stored on said drum which corresponds to each subscriber's line requiring said special service, marking wires connecting said coincidence circuit means to said central register means and to said special subscribers' lines, and gating means controlled by said coincidence circuit for permitting the corresponding selected special signal to be transferred to said special impulse delaying register for conversion and transfer through said multi-stage concentrating means to control said switching system to automatically give a special subscriber's line said special service.

5. A system according to claim 4 wherein said multi-stage concentrating means comprises special line finders, a special connecting circuit, and a special register finder.

6. A system according to claim 5 wherein said special connecting circuit includes means for controlling said connecting circuit of said switching system.

7. A system according to claim 5 wherein some of said marking wires connect said coincidence means to a said special line finder.

8. A system according to claim 5 wherein said special service comprises automatically diverting the calls from one subscriber's line to a predetermined other subscriber's line when said one subscriber's line is being called.

9. A system according to claim 5 including an operator's position circuit and a special operator's position register for selecting any given subscriber's recording position on said drum for changing the special signals recorded thereon.

10. A system according to claim 9 wherein said special service comprises means for connecting a given called subscriber's line to said operator's position circuit.

11. In an automatic communication system having a plurality of subscribers' lines and an automatic switching system having a main distributing frame for said lines, a message service equipment for the subscribers' lines, comprising: a rotating magnetic drum having reading and recording heads for storing instructions corresponding to a given subscriber's line, a plurality of impulse delaying registers cooperating with said heads for temporarily recording said instructions, relays having contacts in said registers, gates controlling the access of said registers to said heads through said contacts of said relays, a rotary distributor coupled to said drum for successive cyclic operation of said relays, an intermediate distributing frame to which said subscribers' lines are connected from said main distributing frame, a multi-stage concentrating means for connecting said lines to said impulse delaying registers, first marking wires corresponding to groups of said lines, second marking wires corresponding with positions on said drum, a coincidence circuit for indicating simultaneously the presence of concordant markings from said first and second marking wires to operate said gates, and a timing impulse means synchronous with said drum for controlling a gate to said register through a said relay contact when said coincidence circuit indicates coincidence between said first and second marking wires for transferring and recording said intelligence in said impulse delaying register for then automatically controlling said switching system.

12. A system according to claim 11 wherein said recording heads correspond to groups of said lines and include corresponding relays operated by said groups.

13. A system according to claim 11 including an operator's position circuit connected to one of said impulse delaying registers for changing the instruction recorded on said drum corresponding to a given subscriber's line.

References Cited in the file of this patent

UNITED STATES PATENTS

| | | |
|---|---|---|
| 2,274,760 | Wicks | Mar. 3, 1952 |
| 2,679,551 | Newby | May 25, 1954 |